April 14, 1959 — E. A. WILCKENS — 2,881,475
APPARATUS FOR APPLYING PLASTIC LINERS TO CLOSURES
Filed Feb. 24, 1956 — 4 Sheets-Sheet 1

INVENTOR:
Eibe A. Wilckens,
BY Cushman, Darby & Cushman
ATTORNEYS.

April 14, 1959   E. A. WILCKENS   2,881,475
APPARATUS FOR APPLYING PLASTIC LINERS TO CLOSURES
Filed Feb. 24, 1956   4 Sheets-Sheet 2
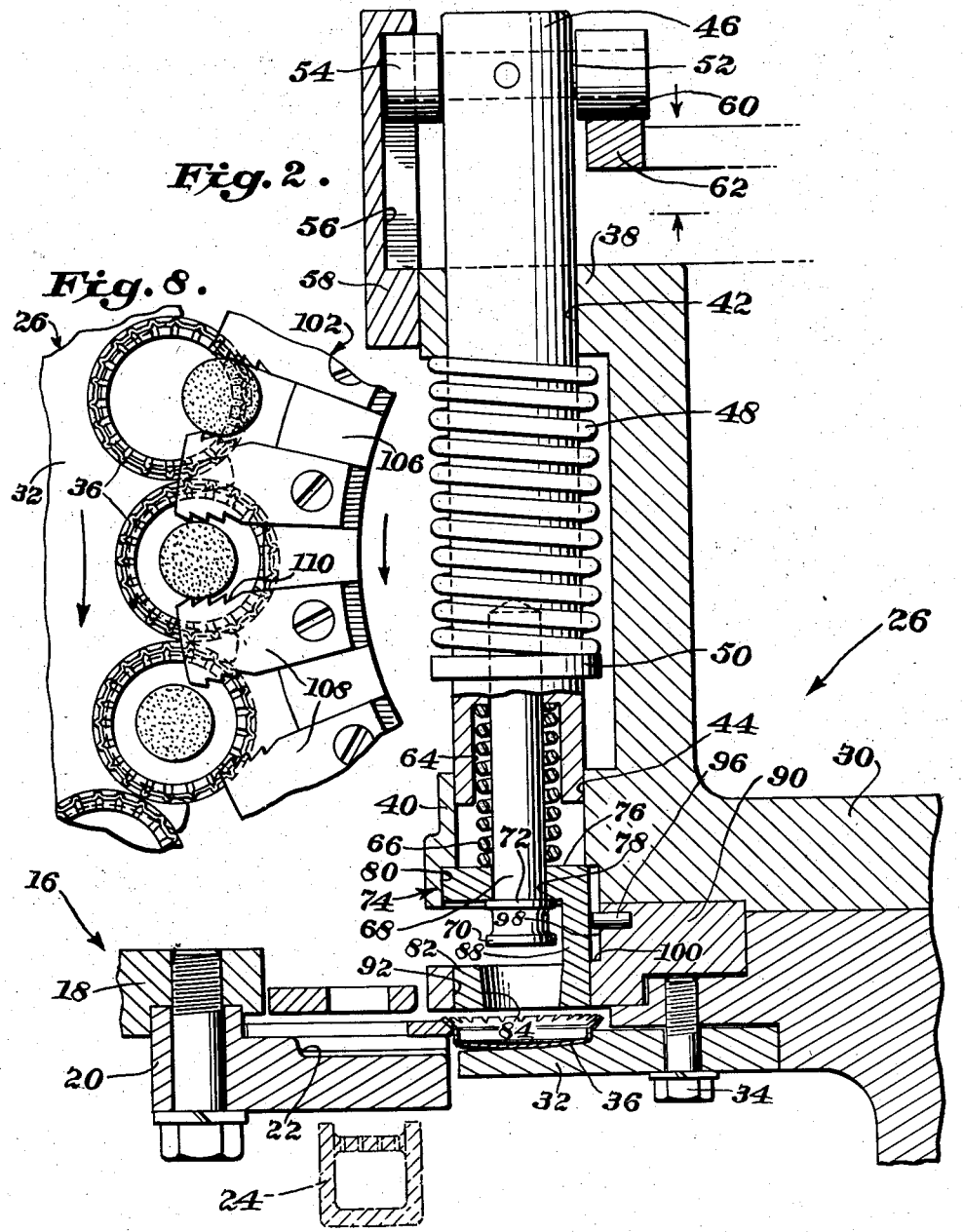
INVENTOR:
Eibe A. Wilckens,
BY Cushman, Darby & Cushman
ATTORNEYS.

April 14, 1959  E. A. WILCKENS  2,881,475
APPARATUS FOR APPLYING PLASTIC LINERS TO CLOSURES
Filed Feb. 24, 1956  4 Sheets-Sheet 3
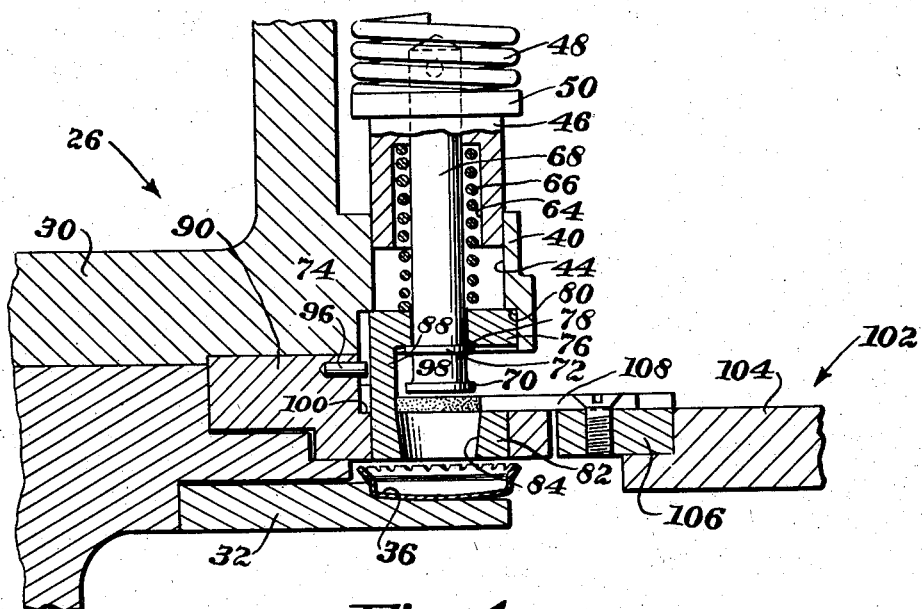
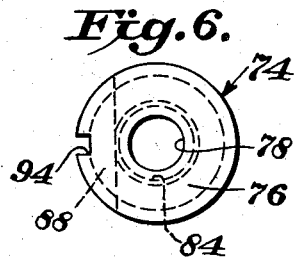
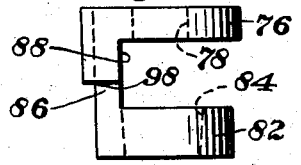
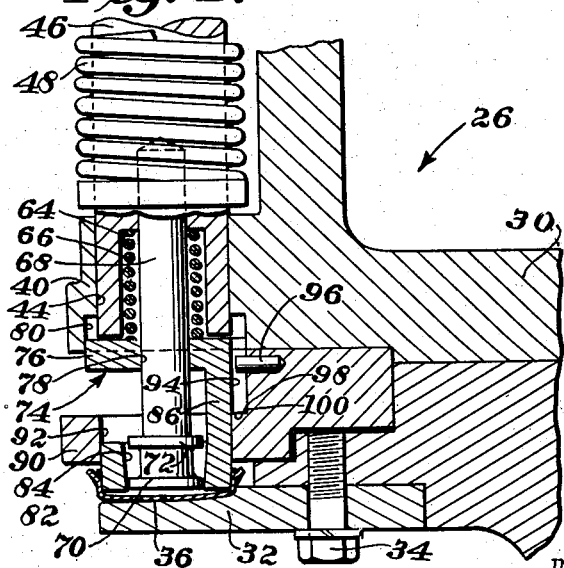
INVENTOR:
Eibe A. Wilckens,
BY Cushman, Darby & Cushman
ATTORNEYS

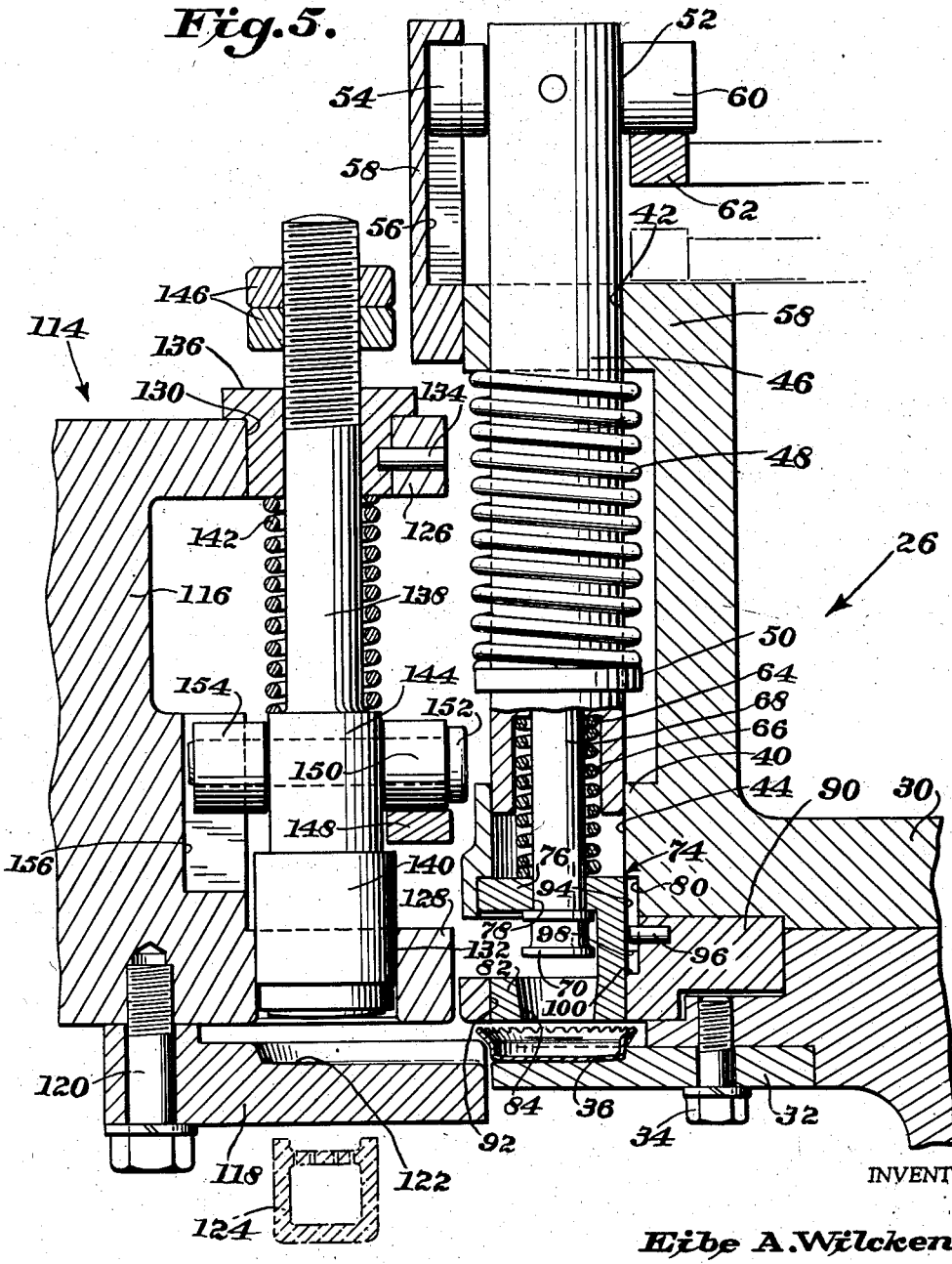

United States Patent Office 2,881,475
Patented Apr. 14, 1959

2,881,475

APPARATUS FOR APPLYING PLASTIC LINERS TO CLOSURES

Eibe A. Wilckens, Baltimore, Md., assignor to Crown Cork & Seal Company, Inc., Baltimore, Md., a corporation of New York Application February 24, 1956, Serial No. 567,497

10 Claims. (Cl. 18—20)

This invention relates to the art of lining closures and, more particularly, to an improved apparatus for applying liners of polyethylene or the like to closures.

It has been customary in the past, particularly with reference to closures of the crown type, to apply a liner of a cork material within the interior of the closure. With the increased activity and development in the plastics field, the utilization of plastic as a material for lining closures has become more and more important. Several methods and machines have been proposed for accomplishing this purpose; as for example, the injection of a charge of plastic in a hot liquid state and subsequent curing of the same or the preforming of the plastic liner and subsequent insertion into the closure. While these procedures are satisfactory for some plastics, when dealing with polyethylene and materials of similar properties, the amount of material utilized in forming the finished liner is of primary importance due to economic considerations. Consequently, preforming the liner with a minimum amount of material results in a preform which is so flimsy as to be difficult, if not impossible, to handle by machine. Moreover, due to the highly viscous nature of polyethylene at its molding temperature, the utilization of hot liquid injection has also not proven satisfactory.

Accordingly, it is an object of the present invention to provide an apparatus operable to apply liners of polyethylene to closures which obtains maximum output and enables the application of a liner containing a minimum amount of material.

Another object of the present invention is the provision of an apparatus embodying means for feeding charges of polyethylene in disk-shaped form containing a predetermined amount of material to the interior of a closure and means for insuring that the charge will be deposited into the central interior of the closure so that upon subsequent molding, the charge will be spread uniformly throughout the interior of the closure.

A further object of the present invention is the provision of a novel assembly dial in an apparatus of the type described which embodies improved plunger means for stripping disk-shaped polyethylene charges from a feeding means and accurately inserting the charges into the central interior of closures.

A still further object of the present invention is the provision of a novel plunger construction in the type of apparatus described having a novel closure-centering and charge-guiding means operatively associated therewith.

These and other objects of the present invention will become more apparent during the course of the following detailed description and appended claims.

The invention may best be understood with reference to the drawings wherein an illustrative embodiment is disclosed.

In the drawings:

Figure 2 is a fragmentary cross-sectional view taken along line 2—2 of Figure 1;

Figure 3 is a fragmentary cross-sectional view taken along line 3—3 of Figure 1;

Figure 4 is a fragmentary cross-sectional view taken along line 4—4 of Figure 1;

Figure 5 is a fragmentary cross-sectional view taken along line 5—5 of Figure 1;

Figure 6 is a detail top plan view of the closure-centering and charge-guiding member of the apparatus;

Figure 7 is a side elevational view of the member shown in Figure 6; and

Figure 8 is a fragmentary top plan view with certain parts removed showing the cooperation between the charge-feeding dial and the assembly dial.

Figure 1:
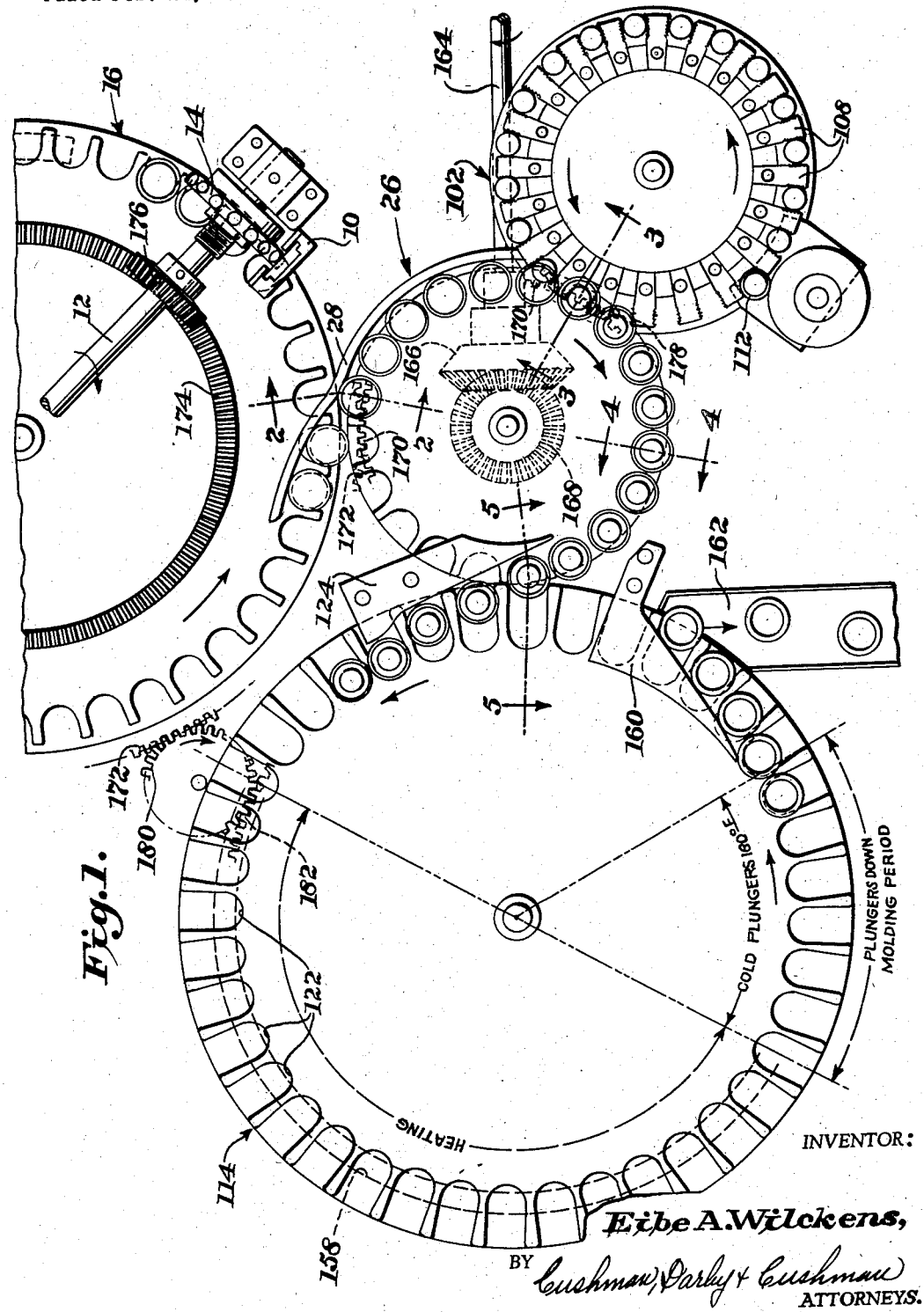
Figure 1 is a somewhat schematic top plan view, partly broken away, of an apparatus embodying the principles of the present invention.

Referring now more particularly to the drawings, there is shown in Figure 1 an apparatus for applying liners to crown type closures which embodies the principles of the present invention. The apparatus includes the usual empty shell-feeding mechanism (not shown) which is operable to deliver properly facing shells into a chute 10 having a lower open end. Rotatably mounted adjacent the lower end of the chute 10, as by a shaft 12, is a shell-transferring wheel 14 which is operable to move the properly facing shells issuing from the lower end of the chute 10 onto a shell-feeding dial 16. The dial 16 comprises a circular dial frame 18 having an annular ring-shaped member 20 secured below the outer periphery thereof. The upper surface of the ring-shaped member 20 is formed with a series of circumferentially spaced pockets or seats 22 which are arranged to receive the shells as they are transferred from the chute 10 by the transferring wheel 14.

On the shell-feeding dial 16, the empty shells are moved past a heating element 24 which is fixedly mounted below the ring member 20 by any suitable means. After the shells have been heated to a predetermined degree, they are transferred from the shell-feeding dial onto an assembly dial, generally indicated at 26. This transfer may be accomplished by any suitable means and, as shown, includes a fixed cam or guide member 28 mounted so as to engage the shell on the seats 22 of the shell-feeding dial and move the same onto the assembly dial.

The assembly dial comprises a main dial frame 30 which is suitably mounted for rotation about a vertical axis. A ring-shaped member 32 is mounted below the outer periphery of the frame 30, as by bolts 34, and has its upper surface formed with a series of circumferentially spaced pockets or seats 36 arranged to support the closures as they are transferred from the shell-feeding dial. The main dial frame 30 includes a pair of vertically spaced, radially extending flanges 38 and 40 having a series of aligned circumferentially spaced apertures 42 and 44, respectively formed therein. Within each pair of aligned apertures 42 and 44, a plunger 46 is mounted for vertical reciprocating movement. A coil spring 48 is disposed around the central portion of each plunger and has its lower end in engagement with a collar 50 secured to the plunger and its upper end in engagement with the lower end of the associated flange 38. The springs 48 thus serve to resiliently urge the plungers downwardly. To effect the upward movement of the plungers, each is provided with a horizontal shaft 52 extending through the upper end thereof. The outer end of each shaft 52 is provided with a guide roller 54 which is arranged to move in a cooperating vertical groove 56 formed in an annular frame member 58 suitably secured to the upper outer periphery of the main dial frame 30. The inner end of each shaft 52 has a cam roller 60 journaled thereon which is adapted to engage an annular cam track 62 suitably mounted above the dial frame in a fixed position. It can thus be seen that cam track 62, and cam rollers 60 control the vertical reciprocation of the plungers in conjunction with the springs 48, while the guide rollers 54 moving in tracks 56 serve to prevent the plungers from movement about their own axes.

The lower end of each plunger 46 has a counterbore 64 formed therein which is arranged to receive the upper end of a second coil spring 66. A plunger rod 68 extends through each coil spring 66 and has its upper end suitably anchored to the lower end of the associated plunger. The lower end of each rod 68 has a plunger head 70 formed thereon and an annular shoulder or abutment 72 is formed on each rod in vertically spaced relation to the head 70. Each abutment 72 is arranged to engage a closure-centering and charge-guiding member, generally indicated at 74. As best shown in Figures 6 and 7, each member 74 includes an upper annular portion 76 having an aperture 78 formed therein through which the associated rod 68 extends. The upper surface of each portion 76 is arranged to engage the lower end of the associated coil spring 66 so that the latter resiliently urges the member 74 downwardly until the lower surface of the portion 76 engages the plunger rod abutment 72. As best shown in Figure 2, the flange 40 is provided with a series of circumferentially spaced counterbores 80 within which the upper portions of the members 74 may extend.

Each member 74 also includes a concentric lower annular portion 82 of a diameter less than the upper portion and having a guide aperture 84 formed therein. The upper and lower portions are interconnected by an intermediate portion 86 so as to form a horizontal slot 88 in each member which faces radially outwardly of the dial.

In order to mount the lower portion of each member 74 in the dial frame for vertical reciprocation, the latter is provided with a second ring member 90 which is mounted just above the ring member 32 in vertically spaced relation therewith. The ring member 90 includes a series of circumferentially spaced apertures 92 which are in alignment with a series of pockets or seats 36 on the ring member 32. The lower portion of each member 74 is slidably mounted within an aperture 92 and in order to prevent the member from turning about its own axis within the aperture, a vertical groove 94 is formed therein. A pin 96 is mounted in the adjacent portion of the ring member 90 so as to extend within each slot 94. In this manner, members 74 are free to reciprocate vertically, but are prevented from rotary movement. Each intermediate portion 86 is formed with a downwardly facing shoulder 98 which is arranged to engage an upwardly facing surface 100 of the ring member 90 adjacent each aperture 92.

As best shown in Figure 2, the empty heated shells from the shell-feeding dial 16 are transferred to the assembly dial 26 with the associated plungers 46 disposed in their uppermost position. The heated empty closures are carried on the assembly dial in this position past a charge-feeding dial, generally indicated at 102. The charge-feeding dial comprises a dial frame 104 suitably mounted for rotation about a vertical axis. Mounted on the outer periphery of the dial frame 104 on the upper end thereof is a ring member 106 having a plurality of circumferentially spaced fingers 108 mounted in a plurality of suitable radially extending grooves formed in the upper surface thereof. As best shown in Figure 8, each of the fingers 108 has its vertical edges serrated, as at 110, so as to retain a disk-shaped charge of polyethylene therebetween. The disk-shaped charges have a diameter less than the interior diameter of the closures to be lined so that for the amount of material necessary to form a finished liner in the closure, the charge will have a thickness sufficient to permit the same to be handled. The disk-shape charges may be fed to the charge-feeding dial by any suitable means, such as a tubular chute 112 suitably mounted at a fixed position adjacent the periphery of the charge-feeding dial.

As the heated empty shells on the assembly dial are carried past the charge-feeding dial, the charges are moved from the latter into the associated closures by the action of the plungers and associated centering and guiding members 74, as will hereinafter be more fully explained. The charged shells are then carried to a point adjacent a molding dial, generally indicated at 114. This dial may take many forms and, as shown, is constructed in a manner generally similar to the assembly dial 26. Referring to Figure 5, the molding dial includes a main dial frame 116 suitably mounted for rotation about a vertical axis. A ring member 118 is mounted below the outer periphery of the dial frame 16, as by bolts 120, and has its upper surface provided with a series of circumferentially spaced pockets or seats 122 arranged to receive and support the charged closures as they are transferred from the assembly dial to the molding dial. To effect this transfer, a guide or cam plate 124 is suitably mounted in a fixed position adjacent the two dials so as to present a surface which will engage the closures on the assembly dial and move the same onto the seats of the molding dial.

The molding dial frame 116 includes a pair of vertical spaced radially extending annular flanges 126 and 128 having a series of circumferentially spaced aligned apertures 130 and 132 respectively formed therein. Secured within each aperture 130, as by pin 134, is a journal 136. The upper end of a plunger 138 is mounted within each journal 136 and each plunger has an enlarged head 140 slidably mounted within the associated aperture 132. A coil spring 142 surrounds the central portion of each plunger 138 and has its upper end in engagement with the lower surface of the associated journal 136 and its lower end in engagement with the upper surface of an enlarged intermediate portion 144 on the associated plunger. Thus, the springs 142 serve to resiliently urge the plungers downwardly and in order to positively limit the downward movement of the plungers, the upper end of each is provided with a pair of cooperating nuts 146 arranged to engage the upper surface of the associated journal 136. The nuts 146 may be secured in any longitudinal position on the plungers so as to vary the lower limit of the latter.

In order to move the plungers upwardly against the action of the springs 142, there is provided an annular cam track 148 which is suitably mounted in a stationary position outwardly of the periphery of the dial frame so as to engage a cam roller 150 mounted on the outer end of a horizontal shaft 152 extending through the intermediate portion 144 of each plunger. The inner end of each shaft 152 has a guide roller 154 journaled thereon which is arranged to move within a cooperating vertical slot 156 formed in the adjacent portion of the dial frame 116. The guide roller and slot arrangement serves to prevent axial rotation of the plungers during the vertical reciprocation of the latter.

As shown in Figure 5, the charged closures are transferred to the molding dial with plungers maintained in their uppermost position and they are carried on the molding dial past a heating element 158 suitably mounted in fixed position below the ring member 118. After the charged closures have been sufficiently heated, the plungers are lowered to finally shape the liners and then the finished closures are transferred from the molding dial, as by a cam or guide plate 160, onto a suitable conveyor belt 162 where they are moved to an inspection station.

It will be understood that the various dials described above may be driven by any suitable means; for example, there is shown in Figure 1 a schematic arrangement whereby all of the dials may be driven continuously in intermeshing engagement. As shown, a shaft 164 extends from a suitably driving motor (not shown) and has a bevel gear 166 mounted on its free end. A cooperating bevel gear 168 is fixedly secured to the assembly dial in meshing engagement with the bevel gear 166 so as to impart rotation to the assembly dial. The assembly dial further includes a fixed ring gear 170 adjacent its periphery which is arranged to mesh with a cooperating ring gear 172 suitably mounted in fixed relation on the shell-feeding dial. The latter also may include a fixed bevel gear 174 which meshes with the cooperating bevel gear 176 fixedly mounted on the shaft 12 for imparting rotary motion to the shell-transferring wheel. The charge-feeding dial is rotated by means of a fixed ring gear 178 which also meshes with the ring gear 170 on the assembly dial. Rotation of the molding dial is effected by means of an idler spur gear 180 suitably mounted in meshing engagement with the ring gear 172 of the shell-feeding dial and a ring gear 182 suitably fixed to the molding dial.

Operation

It will be understood that the shell-feeding dial construction is merely exemplary and that any suitable means for feeding empty closures, preferably in a heated condition, to the assembly dial may be utilized. Thus, beginning the cycle at the point where the preheated empty closures are transferred onto the assembly dial 26, the operation of the present apparatus is as follows. As previously mentioned and shown in Figure 2, the plungers 46 of the assembly dial are disposed in their uppermost position as the heated empty shells are transferred to the seats 36. The plungers are maintained in their uppermost position by engagement of the cam rollers 60 with the cam track 62 which, in turn, compresses the coil springs 48. It will also be noted that the second coil springs 66 are fully extended so as to resiliently urge the lower surface of the upper portion 76 of the centering and guiding members 74 into engagement with the abutments 72 on the plunger rods 68. The slots 88 of the centering and guiding members 74 are aligned with the space between the upper surface of the ring member 90 and the lower surface of the flange 40 with the lower surface of the plunger heads disposed above the former. The preheated empty closures are carried to a point adjacent the charge-feeding dial with the plungers in this condition and it will be noted that the plunger head 70 has a diameter which is slightly smaller than the diameter of the disk-shaped charges.

As shown in Figure 3, the charge-carrying fingers 108 are disposed in a plane just above the upper surface of the ring member 90 so that they may pass within the slots 88 as mentioned above. In addition, the assembly dial and charge-feeding dial are geared together so that the outer ends of the fingers 108 will extend between the plunger rods in a manner similar to the intermeshing of gear teeth. As shown in Figure 8, the path of the movement of the outer end of the fingers is such as to never interfere with the path of movement of the plunger rods. When the disk-shaped charge carried between two adjacent fingers moves directly beneath the associated plunger head, the cam track 62 immediately drops off so as to permit the plunger to move downwardly under the action of spring 48 and strip the charge from between the fingers. During this initial downward movement, the associated centering and guiding member 74 will move downwardly with the plunger under the action of the coil spring 66. As the disk-shaped charge is stripped from between the fingers of the charge-feeding dial, the same will fall into the aperture 84 in the lower portion of the member 74. The cam track 62 is shaped so as to continue the downward movement of the plunger so that the lower portion of the member 74 will enter the interior of the heated shell and thus center the same directly beneath the plunger head on the seat 36.

As best shown in Figure 4, the abutment 98 on the member 74 is positioned so as to stop the downward movement of the member with the lower surface thereof disposed above the central interior surface of the closure a distance substantially equal to the thickness of the disk-shaped charge. After the centering the guiding member 74 has been stopped, further downward movement of the plunger will result in a relative movement between the plunger head 70 and the member 74 thus compressing the spring 66 and moving the plunger head through the aperture 84. The latter is slightly frusto-conical and serves to guide the disk-shaped charge downwardly into the central interior of the centered closure disposed therebelow as it is moved downwardly by the plunger. The preheated condition of the shell effects an initial bond between the closure and the charge so that the latter will remain in its centered position as it is transferred onto the molding dial 114. It will be understood that after the plungers have deposited the charges into the central interior of the closures, cam track 62 is shaped to move the plungers into their uppermost position so as to permit transfer to the molding dial.

As shown in Figure 5, the plungers will be disposed in their uppermost position as the assembly dial moves past the molding dial so that cam plate 124 can effect the transfer of the charged shells from the former to the latter. On the molding dial, the charged shells are first subjected to an elevated temperature by means of the heating element 158. Preferably during the heating of the charges, which occurs, during approximately ½ of a revolution of the dial, the plungers are maintained in their uppermost position, as shown in Figure 5. After the heating period cam track 148 is shaped to permit the plungers to move downwardly under the action of springs 142 into engagement with the heated charges to effect a final molding of the liner. The plungers are maintained in their downward position a distance equal to approximately a 60° angle of travel of the dial and then the cam track 148 is shaped to move the plungers upwardly to permit removal of the finished closures by means of the cam plate 160.

As was previously mentioned above, a significant feature of the present invention resides in the construction of the assembly dial and the manner in which it cooperates with the other dials of the apparatus to form a finished liner. The molding dial may be of any construction and the details shown are merely exemplary. The provision of the shell-centering and charge-guiding member in the assembly dial is particularly important when dealing with polyethylene liner material and other materials which are relatively expensive and which are highly viscous at their molding temperatures. The latter property prevents ready handling of the hot material in high speed machinery, such as the present apparatus. In addition, since it is economically essential to utilize a minimum amount of material in each closure, the finished liner should be made extremely thin toward its center. A preformed liner shaped in this way would also be impossible to handle in a high speed apparatus of the present type. These problems of handling the charge by high speed machine are effectively overcome by utilizing a charge disk-shaped form having a thickness sufficient to permit ready handling. These charges are subsequently pressed into a thin liner so that of necessity their diameter is less than the interior diameter of the closure. Likewise, in order to insure that the material will be distributed even throughout the interior of the closure when so pressed, it is essential that the charge be deposited in the exact central interior of the closure. With the present arrangement, this essential condition is accomplished in a high speed apparatus. Further, the formation of the charges themselves is a relatively simple and inexpensive procedure. The polyethylene may be extruded into a continuous roll of approximately ⅝ inch diameter. After passing through a cooling bath, the polyethylene may be cut into lengths sufficient to make about 36 charges. These length may then be cut into disk-form by the use of conventional 36 knife disk cutters such as are presently utilized in cutting cork liners. The feeding of these disks to the disk-feeding dial is a relatively simple matter since polyethylene has a relatively low coefficient of friction and a single disk may be readily moved from the bottom of a stack of such disks mounted in a feeding tube, such as feeding tube 12.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In an apparatus for lining closures, a rotary dial having a plurality of circumferentially spaced seats thereon for supporting a series of closures, a plunger mounted on said dial adjacent each seat for movement toward and away from the latter, means disposed adjacent said dial for presenting successive disk-shaped charges of liner material between successive seats and plungers so that movement of the latter toward the former will move said charges toward the closures on said seats, and means operatively associated with each of said plungers for centering the closures with respect to said plungers and guiding the charges into the central interior of the closures, said closure-centering and charge-guiding means comprising a member mounted for vertical reciprocation above each of said seats, each of said members including an upper annular portion having an aperture extending therethrough for receiving the associated plunger, a lower annular portion arranged to snugly engage within the interior of a closure and having an aperture extending therethrough for receiving the charge and lower end of the plunger, and an intermediate portion connecting said upper and lower portions so as to form a charge-receiving opening extending radially outwardly between said upper and lower portions.

2. In an apparatus as defined in claim 1 wherein said closure-centering and charge-guiding means also includes a spring pressed lost motion connection between each of said members and its associated plunger, said spring pressed lost motion connection comprising an abutment on said plunger above the lower end thereof disposed below the upper portion of said member and arranged to engage the same and a spring between said plunger and member resiliently urging the latter into engagement with the abutment on said plunger.

3. In an apparatus as defined in claim 2, each of said members and said dial having cooperating surfaces arranged to prevent downward movement of the members beyond a position wherein the lower end thereof is disposed above the central interior of the closure a distance at least as great as the thickness of the charge.

4. In an apparatus for lining closures, a first dial rotatable about a vertical axis and having a plurality of circumferentially spaced seats thereon for supporting a series of closures, a plunger mounted on said dial above each seat for vertical reciprocating movement, a second dial rotatable about a parallel vertical axis and having circumferentially spaced means for supporting a series of disk-shaped charges of liner material of a diameter substantially less than the interior diameter of the closures to be lined, said circumferentially spaced means comprising a plurality of radially extending fingers spaced apart to receive the disk-shaped charges therebetween, said second dial being positioned to present successive charges between successive seats and plungers on said first dial so that downward movement of the latter will strip said charges from said second dial and move the same toward the closures supported on said seats, and means operatively connected to each of said plungers for centering the closures beneath said plungers and guiding the charges into the central interior of the closures as they are moved therein by said plungers.

5. In an apparatus as defined in claim 4, said dials having their peripheries overlapping with the fingers of said second dial shaped to engage between the plungers of said first dial.

6. An apparatus for applying liners of polyethylene to closures comprising means for moving a series of closures along a predetermined path between an empty closure-receiving station and a finished closure-discharging station, plunger means disposed above the path of movement of the empty closures, means for feeding successive solid polyethylene disks of a diameter substantially less than the interior diameter of the closures between said plunger means and the closures, said feeding means comprising a continuously rotatable dial having a plurality of spaced radially extending fingers ranged to carry the polyethylene disks therebetween, means operatively associated with said plunger means for centering the closures under the latter and for guiding the disks into the central interior of the closures upon movement of said plunger means toward the closures, and means disposed along said path for molding the centered polyethylene disks in the closures under heat and pressure so that they extend over a greater diameter.

7. An apparatus as defined in claim 6, wherein said closure moving means comprises a series of continuously rotatable dials.

8. An apparatus as defined in claim 7, wherein one of said dials includes a plurality of circumferentially spaced seats for supporting the closures and said plunger means comprises a plunger mounted for vertical reciprocation above each of said seats.

9. In an apparatus for lining closures, a frame having a closure-supporting seat thereon, a plunger mounted above said seat for movement toward and away from the latter, said plunger having a head on the lower end thereof of a diameter less than the interior diameter of the closure to be lined, and a charge-centering member mounted adjacent said plunger head for vertical movement with respect thereto, said member including an upper portion slidably mounted on said plunger above said head, a lower portion having an exterior diameter conforming to the interior diameter of the closure to be lined, and an intermediate portion between said upper and lower portions maintaining the same in spaced relation so as to form a laterally extending opening therebetween for receiving a disk-shaped liner charge, said lower portion having an aperture extending therethrough of a diameter at least as large as the diameter of said plunger head through which the disk-shaped liner charge is moved by the plunger head into the central interior of the closure.

10. In an apparatus as defined in claim 9, said plunger having an abutment formed thereon below said upper member portion for engaging the latter and a spring between said plunger and said upper member portion resiliently urging said member downwardly.

References Cited in the file of this patent

UNITED STATES PATENTS

| 1,053,898 | Bogdanffy | Feb. 18, 1913 |
| 1,647,379 | Swift | Nov. 1, 1927 |
| 1,956,012 | Egan | Apr. 24, 1934 |
| 2,218,540 | Kronquest | Oct. 22, 1940 |
| 2,428,878 | Johnson | Oct. 14, 1947 |
| 2,479,959 | O'Neil | Aug. 23, 1949 |
| 2,553,590 | Joswig | May 22, 1951 |
| 2,564,624 | Hoos | Aug. 14, 1951 |
| 2,654,914 | Maier | Oct. 13, 1953 |
| 2,688,776 | Evans et al. | Sept. 14, 1954 |